(12) United States Patent  (10) Patent No.:  US 9,031,920 B2
Soltani et al.  (45) Date of Patent:  May 12, 2015

(54) OBJECTS IN A STORAGE ENVIRONMENT FOR CONNECTED APPLICATIONS

(75) Inventors: Anoshirwan Soltani, Leimen (DE); Markus Latzina, Wiesenbach (DE)

(73) Assignee: SAP SE, Walldorf, DE (US)

(*) Notice: Subject to any disclaimer, the term of this patent is extended or adjusted under 35 U.S.C. 154(b) by 32 days.

(21) Appl. No.: 13/290,705

(22) Filed: Nov. 7, 2011

(65) Prior Publication Data
US 2013/0117319 A1  May 9, 2013

(51) Int. Cl.
*G06F 7/00* (2006.01)
*G06F 9/54* (2006.01)
*G06F 17/30* (2006.01)

(52) U.S. Cl.
CPC .......... *G06F 9/541* (2013.01); *G06F 17/30569* (2013.01)

(58) Field of Classification Search
USPC .......................................... 707/674, 679, 694
See application file for complete search history.

(56) References Cited

U.S. PATENT DOCUMENTS

| | | | |
|---|---|---|---|
| 5,204,947 A * | 4/1993 | Bernstein et al. ............. | 715/854 |
| 5,384,697 A * | 1/1995 | Pascucci ........................ | 700/10 |
| 5,930,798 A * | 7/1999 | Lawler et al. ................. | 707/694 |
| 5,940,835 A * | 8/1999 | Sit ................................. | 1/1 |
| 6,034,681 A | 3/2000 | Miller et al. | |
| 6,326,962 B1 * | 12/2001 | Szabo ........................... | 715/762 |
| 7,603,380 B2 * | 10/2009 | Deffler .......................... | 1/1 |
| 2002/0169786 A1 * | 11/2002 | Richek ......................... | 707/103 R |
| 2004/0088713 A1 * | 5/2004 | Myllymaki et al. ........... | 719/315 |
| 2005/0198612 A1 | 9/2005 | Gonzalez | |
| 2006/0212543 A1 * | 9/2006 | O'Farrell et al. ............. | 709/219 |
| 2007/0260628 A1 * | 11/2007 | Fuchs et al. ................... | 707/101 |
| 2008/0091763 A1 | 4/2008 | Devonshire et al. | |
| 2008/0162498 A1 * | 7/2008 | Omoigui ........................ | 707/10 |
| 2008/0275844 A1 * | 11/2008 | Buzsaki et al. ................ | 707/3 |
| 2009/0157635 A1 * | 6/2009 | Fuchs et al. ................... | 707/3 |
| 2011/0047187 A1 * | 2/2011 | Sinha et al. ................... | 707/802 |

\* cited by examiner

*Primary Examiner* — Hosain Alam
*Assistant Examiner* — Eliyah S Harper
(74) *Attorney, Agent, or Firm* — Brake Hughes Bellermann LLP

(57) ABSTRACT

In one general aspect, a computer system can include instructions stored on a non-transitory computer-readable storage medium. The computer system can include an application link manager configured to receive an indicator that a first application is linked to a second application, and an object generator configured to store a copy of data from a database of the first application and represented within a user interface of the first application as a core object in a storage environment in response to the indicator that the first application is linked to the second application. The computer system can also include a database link manager configured to link a database of the second application with the core object stored in the storage environment in response to the copy of the data being stored as the core object in the storage environment.

21 Claims, 12 Drawing Sheets

OBJECTS IN A STORAGE ENVIRONMENT FOR CONNECTED APPLICATIONS

TECHNICAL FIELD

This description relates to objects for connected applications.

BACKGROUND

Portions of a business process can be implemented using several different applications that may have various incompatibilities with one another. The incompatibilities can arise from differences in programming technologies, shifting scope in product requirements, differing application development philosophies for different portions of a product, timing with which applications within a product are developed, and so forth. For example, when the scope of an overall set of requirements associated with a business process exceeds the capacities of a single programming team, the overall programming effort for applications to implement the business process may be divided and assigned to different teams which work concurrently. Even if jointly managed, the applications produced by the different teams to implement the business process can have some incompatibilities. As another example, an application can be developed to address a requirement associated with one portion of a business process and another application can later be developed to address an unforeseen issue (e.g., an issue raised by a customer) associated with another portion of the business process that arises at a later time. Even if the applications are not developed by different entities, the applications may have several incompatibilities. The incompatibilities between the applications can be even more drastic if produced by separate entities. Accordingly, several applications, even if intended to interoperate, may not form a cohesive set of applications to implement a business process, but may instead behave, at least in part, as independently operating applications that can have some deficiencies when combined.

A variety of techniques can be employed to close the gaps between incompatible portions of applications, or for removing the inconsistencies between applications which arise despite the fact that, on a semantic level, the individual applications are interrelated. For example, on a user interface level, users can reuse data strings across various applications, for example, by copying and pasting some text from one application to another application. However, this process can be time-consuming and inconvenient for an end-user. Thus, a need exists for systems, methods, and apparatus to address the shortfalls of present technology and to provide other new and innovative features.

SUMMARY

In one general aspect, a computer system can include instructions stored on a non-transitory computer-readable storage medium. The computer system can include an application link manager configured to receive an indicator that a first application is linked to a second application, and an object generator configured to store a copy of data from a database of the first application and represented within a user interface of the first application as a core object in a storage environment in response to the indicator that the first application is linked to the second application. The computer system can also include a database link manager configured to link a database of the second application with the core object stored in the storage environment in response to the copy of the data being stored as the core object in the storage environment.

In another general aspect, a non-transitory computer-readable storage medium can be configured to store instructions that when executed cause a processor to perform a process. The instructions can include instructions to receive an indicator that a first application is linked to a second application, and instructions to store a copy of data from a database of the first application and represented within a user interface of the first application as a core object in a storage environment in response to the indicator that the first application is linked to the second application. The instructions can also include instructions to link a database of the second application with the core object stored in the storage environment in response to the copy of the data being stored as the core object in the storage environment.

In yet another general aspect, a method can include executing instructions recorded on a non-transitory computer-readable storage media using at least one processor. The method can include receiving an indicator that a first application is linked to a second application, and storing a copy of data from a database of the first application and represented within a user interface of the first application as a core object in a storage environment in response to the indicator that the first application is linked to the second application. The method can also include linking a database of the second application with the core object stored in the storage environment in response to the copy of the data being stored as the core object in the storage environment.

The details of one or more implementations are set forth in the accompanying drawings and the description below. Other features will be apparent from the description and drawings, and from the claims.

DETAILED DESCRIPTION

Figure 1:
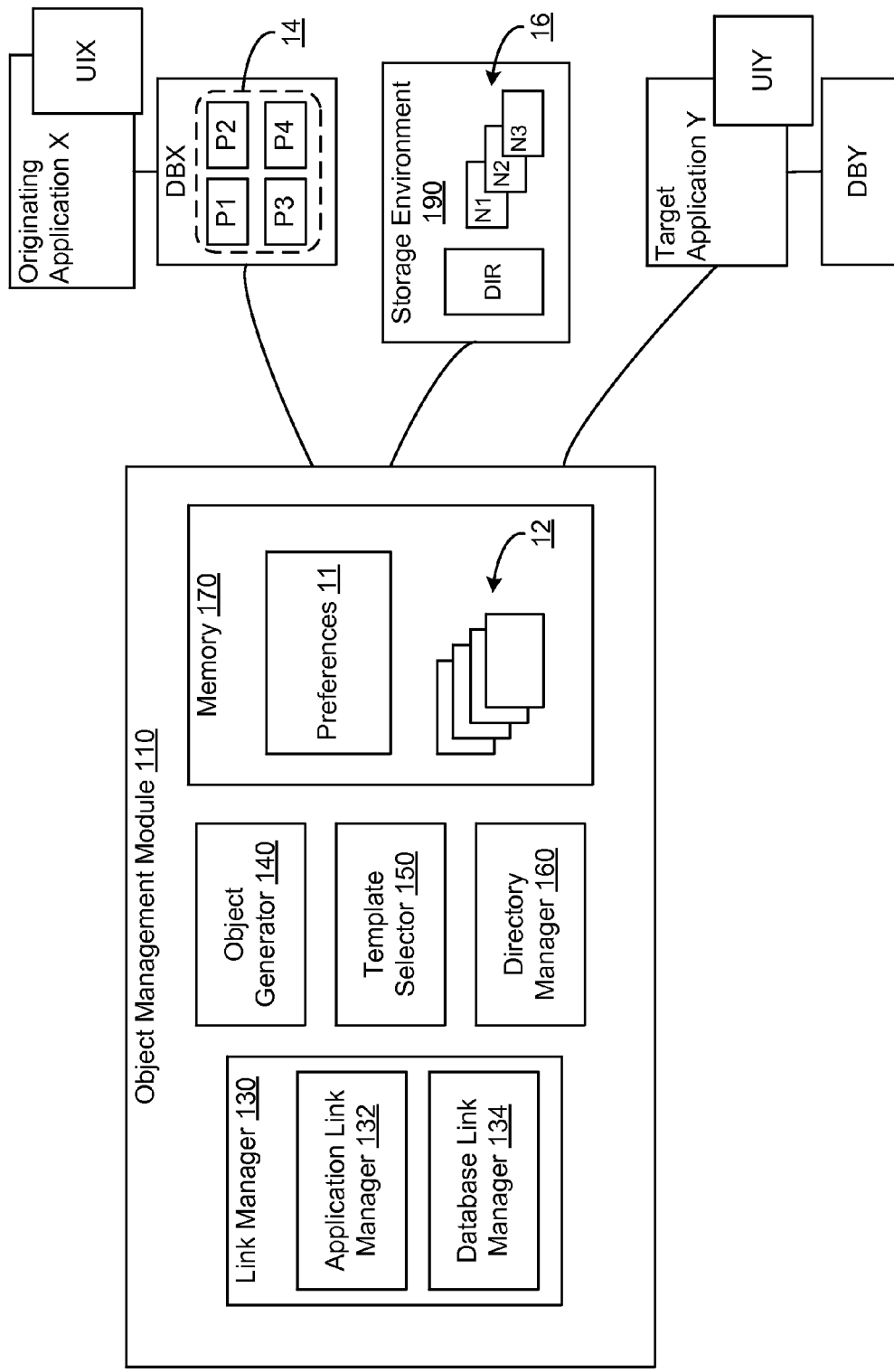
FIG. 1 is a block diagram that illustrates an object management module, according to an embodiment.

FIG. 1 is a block diagram that illustrates an object management module 110, according to an embodiment. The object management module 110 is configured to make one or more originating objects 14 (or portions thereof) associated with an originating application X available to a target application Y. The originating objects 14 include originating objects P1 through P4. The originating objects 14 can be stored in a database DBX associated with the originating application X. Although not shown in FIG. 1, one or more of the originating objects 14 can be defined by (e.g., can include) various types of data (e.g., parameter values, values, indicators) within various types of structures (e.g., data structures, rows, columns, fields, formats). In some embodiments, the originating application X, because it is the application from which objects originate, can be referred to as an originating application. The target application Y, because it is a target of one or more objects (e.g., originating objects), can be referred to as a target application.

For example, data included in originating object P1 can be represented within (e.g., displayed within a field of) a user interface UIX associated with originating application X. Originating object P1 can be made available by the object management module 110 so that at least a portion of the data included in originating object P1 can be represented within a user interface UIY associated with target application Y, or another application (not shown).

The object management module 110 can be configured to make one or more of the originating objects 14 (or portions thereof) associated with originating application X available to target application Y even though at least some portions of target application Y may be incompatible with (e.g., may not be compatible) with originating application X. For example, originating application X and target application Y can be applications based on different platforms, different programming languages, different parameters, incompatible data formats, and/or so forth.

As a specific example, originating application X can be an application configured to facilitate processing of data associated with a business process (e.g., an equipment leasing process, a purchase process, a customer service process) an target application Y can be an application configured to facilitate processing of data associated with a different business process (e.g., an insurance procurement process, an invoicing process). Originating application X and target application Y can be applications developed by different companies using, for example, different data handling algorithms. Because originating application X and target application Y may not have been developed specifically for compatibility, data from originating application X may not be handled by target application Y in a desirable fashion (e.g., in a compatible fashion). In such instances, the object management module 110 can be configured to process data and/or modify the data associated with each of the applications so that the data can be shared between the applications. In some embodiments, one or more of the applications X, Y can be tools, widgets, and/or so forth.

In some embodiments, the object management module 110 can be configured to handle the data (which can be included in one or more objects) associated with applications which may have portions that are not compatible (such as originating application X and target application Y) so that coherent processing between the applications can be achieved even if the overall or final scope of the combination of the applications is not known beforehand. In some embodiments, the object management module 110 can be configured to manage data between applications so that retroactively integrating isolated pieces of the applications for compatibility may be avoided. In addition, the object management module 110 can be configured to manage data between applications so that additional components appended to one or more applications, regardless of whether the appended portions are uniquely created, are being made incrementally, are tentatively open-ended, and so forth, can be utilized in an integrated fashion with other applications.

In some embodiments, the applications X, Y can be applications operating at, for example, a computing device (e.g., a mobile device, a personal computer), a host device, and/or so forth. The user interfaces UIX, UIY associated with the applications X, Y, respectively, can be configured so that one or more functions associated with the applications X, Y can be triggered (e.g., utilized, manipulated). In some embodiments, the applications X, Y can be configured to operate in conjunction with (e.g., at) an application server. The applications X, Y can each be any type of application such as a business process application, a mathematics application, a background application, and/or so forth.

As shown in FIG. 1, the object management module 110 includes an object generator 140. The object generator 140 is configured to produce (e.g., define, store) one or more core objects 16 stored in the storage environment 190 based on one or more of the originating objects 14 (or based on a portion of the data included in one or more of the originating objects 14) associated with originating application X and targeted to be made available to the target application Y. The core objects 16 can be produced by the object management module 110 as objects that can be handled between applications (such as originating application X and target application Y) that have at least some incompatibilities. In some embodiments, one or more of the core objects 16 can be produced on a semantic level as objects that can be handled between applications (such as originating application X and target application Y) that have at least some incompatibilities. In this embodiment, the core objects 16 include objects N1 through N3. In some embodiments, originating objects 14 and/or the core objects 16 can generically be referred to as objects or as database objects.

For example, core object N1 from the core objects 16 can include data from originating object P1 from the originating objects 14. Even though the originating object P1 may not be compatibly processed by the target application Y, the core object N1, which includes the data from the originating object P1, can be defined so that the target application Y can process the data when included in the core object N1. Thus, the core object N1 can be defined so that the target application Y can have access to the data of the originating object P1 even though the target application Y may not be configured to compatibly process the data when included in the originating object P1.

As another example, originating object P1 (or a portion thereof such as data included in originating object P1) may be identified as an object to be made available for processing by target application Y. In response to the identification of originating object P1 as an object to be made available for processing by target application Y, the object generator 140 can be configured to store a copy of the originating object P1 (or at least a portion thereof) in the storage environment 190 as one of the core objects 16. When stored as one of the core objects 16 and the storage environment 190, the data originally included in the originating object P1 can be accessed and used by target application Y (e.g., represented within the user interface UIY of target application Y).

In some embodiments, the storage environment 190 can be a cloud-based storage environment (also can be referred to as a cloud storage environment) (e.g., a cloud storage environment associated with a cloud computing environment), which can include data formats for both structured and unstructured data. In some embodiments, one or more of the core objects 16 can be stored in the storage environment 190 as structured or as unstructured data.

In some embodiments, the core objects 16 stored in the storage environment 190 can be temporarily stored in the storage environment 190. For example, data included in (e.g., defining, associated with) originating object P1 can be stored as one of the core objects 16 in the storage environment 190 so that the data included in originating object P1 can be made available for processing by target application Y. After processing by target application Y has been completed, the core object including the data from originating object P1 can be removed from the storage environment 190. Accordingly, one or more of the core objects 16 can be temporarily stored in the storage environment 190 based on a scope of usage of the core object(s) 16.

In some embodiments, one or more of the core objects 16 stored in the storage environment 190 can be based on a format that is different than one or more of the originating objects 14. In other words, one or more of the core objects 16 can have a format that is translated from a format of one or more originating objects 14. In some embodiments, the object generator 140 can be configured to handle translation (e.g., conversion, transformation) of an originating object into one of the core objects 16. For example, core object N2 can be defined based on originating object P1 by the object generator 140. Originating object P1 can be based on a format (e.g., a storage format, a data format, a file format) that is different than a format of the core object N2. The object generator 140 can be configured to handle the conversion of the format of the originating object P1 (which may be compatible with a first set of applications and incompatible with a second set of applications) into the core object N2 (which may be compatible with the second set of applications and incompatible with the first set of applications).

In some embodiments, one or more of the core objects 16 stored in storage environment 190 can be associated with (e.g., can include, can be stored with) metadata (which can be referred to as attributes). Specifically, metadata can describe data included in one or more of the core objects 16. In some embodiments, the metadata can be referred to as annotations. Metadata can be added to one or more of the core objects 16 by the object generator 140. For example, metadata associated with core object N1 can include data identifying an origin of the data included in the core object N1, the type of data included in the core object N1, a format of the core object N1, an identification of fields within which data of the core object N1 may be included (e.g., displayed, represented), access permissions of data of the core object N1, expiration information (for expiration of the core object N1), parameter values that can be used to identify data (and/or the potential usage/function of the data) included in the core object N1, and/or so forth.

In some embodiments, metadata associated with one or more of the core objects 16 can be defined (e.g., defined by the object generator 140) so that data included in one or more of the core objects 16 can be used by various applications. For example, data included in originating object P2 associated with originating application X may include various types of data. If originating object P2 is identified as an object targeted for use by target application Y, a copy of the data from originating object P2 can be stored as data in core object N3 in the storage environment 190. If the data is identified within the originating object P2 in a fashion that would not be compatible with target application Y, the data included in core object N3 can be annotated with metadata so that the data (which is a copy of the data included in originating object P2) can be processed by target application Y in a desirable fashion when stored in core object N3. In other words, the metadata can include identifiers (e.g., labels, references) that can be used by target application Y to process the data. The identifiers may be different identifiers than those used by originating application X to process the data from originating object P2.

In some embodiments, one or more of the core objects 16 can be defined by the object generator 140 based on one or more templates 12. For example, in an originating object, data such as an address of a buyer, a name of the buyer, and a date may be stored using identifiers (e.g., labels) that can be used by an originating application to recognize the data but may not be used by a target application to recognize the data. A template from the templates 12, which are stored in a memory 170) can include locations where the data such as the address of the buyer, the name of the buyer, and the date can be inserted. The identifiers included in the template may be configured so that the data can be recognized by the target application. The object generator 140 can be configured to define a core object based on the template by inserting the data included in the originating object into the template. Accordingly, the data, when included in the core object, can be compatibly processed by the target application.

In some embodiments, various preferences can be associated with one or more of the templates 12. For example, a template from the templates 12 can be configured so that a core object (e.g., core objects 16) based on the template may be used with a specified set of target applications and/or originating applications (e.g., a set of applications associated with a particular type of business transaction), in accordance with a specified access permission, by only an authorized user account, for a specified duration, and/or so forth. In some embodiments, a template from the templates 12 can be configured so that a core object (e.g., core objects 16) based on the template may be automatically removed (e.g., deleted) from the storage environment 190 in response to a specified time period expiring.

As shown in FIG. 1, the object management module 110 includes a template selector 150. The template selector 150 can be configured to select one or more of the templates 12 for use by the object generator 140 to produce one or more of the core objects 12 based on one or more originating objects (e.g., originating objects 14) associated with an originating application (e.g., originating application X). In some embodiments, the template selector 150 can be configured to select a template from the template 12 based on compatibility of the template with one or more originating objects associated with the originating application. For example, a template may be selected from the templates 12 by the template selector 150 if the template can be used with more data from an originating object than might be used with other templates from the templates 12. In some embodiments, a template may be selected from the templates 12 because the template is configured for a particular type of originating application (e.g., an originating application associated with a specified business process).

In some embodiments, a template may be selected from the templates 12 based on a compatibility of the template with a target application. For example, a template may be selected from the templates 12 based on the template being configured for a core object to be processed by a particular target application.

In some embodiments, one or more of the core objects 16 may be stored as unstructured data within the storage environment 190. In such embodiments, one or more of the core objects 16 may be stored without using one or more of the templates 12 stored in the memory 170. Also, in such embodiments, a structure of a core object from the core objects 16 may be defined as the core object is being stored. In other words, one or more of the core objects 16 may be stored in the storage environment 190 without a predefined structure.

In some embodiments, metadata associated with one or more of the core objects 16 can indicate a target application (e.g., a function, a service) that can be used in conjunction with one or more of the core objects 16. In some embodiments, the target applications that are identified as being compatible with a core object can be, for example, specified by a user, specified within one or more of the templates 12, and/or so forth.

As shown in FIG. 1, the object management module 110 includes a directory manager 160. The directory manager can be configured to produce and/or update a directory DIR related to core objects 16 stored in the storage environment 190. In some embodiments, the directory DIR can include references and/or metadata (e.g., metadata descriptions) related to the core objects 16. In some embodiments, the references and/or metadata included in the directory DIR can be used by one or more target applications, such as target application Y, to identify one or more core objects (e.g., core objects 16) that can be used by the target applications for various types of processing. In other words, one or more of the core objects 16 can be indexed within the directory DIR so that the core objects 16 (or target application to which the core objects 16 may apply) can be searched. For example, if one of the core objects 16 includes information about a customer or a transaction, a target application needing the information about the customer or the transaction can be configured to search (in response to input from a user) the core objects 16 via the directory DIR to identify one or more core objects 16 that may include the information about the customer or the transaction.

In some embodiments, a target application that already has access to a set of core objects from the core objects 16 can further search the core object 16 via the directory DIR for additional core objects that may include data applicable to the target application. For example, the target application Y may be associated with core object N1 from the core objects 16. The core object N3 can later be associated with the target application Y as including data that can be used by the target application Y via a search of the directory DIR.

The directory manager 160 can be configured to update the directory DIR as core objects are produced and stored in the storage environment 190, and as core objects are removed from the storage environment 190. In some embodiments, the directory manager 160 can be configured to remove references to one or more of the core objects 16 that are no longer available. In this embodiment, the directory DIR is included in the storage environment 190, but in some embodiments, the directory DIR can be stored in a memory separate from the storage environment 190.

In some embodiments, one or more of the core objects 16 that is stored on a relatively persistent basis (e.g., stored for use by multiple applications rather than based on a single linkage between applications) within the storage environment 190 can be tracked. In other words, various statistic values related to one or more of the core objects 16 can be stored by, for example, the directory manager 160.

For example, in some embodiments, usage (e.g., frequency of usage, reuse) of a particular core object from the core objects 16 can be calculated (e.g., calculated by the directory manager 160). In some embodiments, at least a portion of the core objects 16 can be ranked based on, for example, usage. The usage of the portion of the core objects 16 can be communicated to applications that may be eligible to use data stored in the portion of the core objects 16. In some embodiments, a probability of at least a portion of data associated with a core object from the core objects 16 can be stored. The probability data can be stored as metadata with the core object, and can be used to, for example, determine whether or not the core object should be purged from the storage environment 190 after being used. In some embodiments, the probability can be calculated for a core object based on a particular template based on prior history usage of other core objects based on the particular template.

In some embodiments, the directory manager 160 can be configured to advertise (e.g., advertise via a notification, advertise metadata descriptions of) one or more of the core objects 16 available within the storage environment 190 to one or more applications (e.g., available applications). In some embodiments, the directory manager 160 can be configured to advertise at least one of the core objects 16 to applications that may compatibly process the advertised core object. In some embodiments, the directory manager 160 can be configured to advertise one or more of the core objects 16 to one or more applications that may be linked to and/or may not yet be linked to, for example, applications from the which the core objects 16 are derived. For example, the directory manager 160 can be configured to advertise core object N1 to an application that is not yet linked to application X (from which the core object N1 may be derived). As another example, the directory manager 160 can be configured to advertise core object N2 (which may not yet be linked to target application Y in some embodiments) to target application Y so that data from the core object N2 can be used by target application Y.

One or more of the core objects 16 can be produced and stored in the storage environment 190 in response to links (e.g., relationships) being formed between, for example, an originating application (e.g., originating application X) and a target application (e.g., target application Y). As shown in FIG. 1, the object management module 110 includes a link manager 130 configured to detect and/or form links. In some embodiments, the links can be logical links or virtual links that are stored in the memory 170 of the object management module 110. In some embodiments, when one or more components (e.g., databases, applications) are linked, the applications have access to, or are in communication with, one another. In other words, a component can have access (e.g., unidirectional access, bidirectional access) to another component when linked.

The link manager 130 includes an application link manager 132 configured to detect links between applications such as the originating application X and the target application Y. For example, the application link manager 132 can be configured to detect a link created by a user between the originating application X and the target application Y. In response to the link being detected by the application link manager 132, the object generator 140 can be configured to produce one or more core objects 16 for the target application Y based on the originating objects 14 associated with the originating application X.

In some embodiments, the application link manager 132 can be configured to detect when a link between the originating application X and the target application Y is removed. In response to the link being removed, one or more of the core objects 16 that were produced in response to the link between the originating application X and the target application Y can be removed from the storage environment 190 by the object generator 140. In some embodiments, the directory manager can be configured to update the directory DIR in response to the link being removed.

In some embodiments, one or more of the core objects 16 that were produced in response to a link between the originating application X and the target application Y being formed can be removed from the storage environment 190 by the object generator 140 when data from the core object(s) 16 have been used. For example, the core object N1, which can be produced based on originating object P1, can be removed from the storage environment 190 in response to data from the core object N1 being represented within the user interface UIY of the target application Y. In some embodiments, the object generator 140 can be configured to permit the target application Y to access the data from the core object N1. In some embodiments, the object generator 140 can be configured to deny another application that is not linked (or not yet linked) to the originating application X to access the data from the core object N1 (which was derived from data associated within the originating application X).

In some embodiments, a core object from the core objects 190 may not be removed from the storage environment 190 in response to a link that originally triggered production of the core object being removed. For example, core object N2 can be produced in response to a link between the originating application X and the target application Y being formed. After the link between the originating application X and the target application Y is removed, the core object N2 can remain in the storage environment 190 and can be available for use by applications (e.g., target application) subsequently linked to the originating application X or to applications that may not subsequently be link to the application X. In some embodiments, the core object N2 may only be available to applications that are linked to the originating application X. In some embodiments, the core object into may be removed from the storage environment 190 in response to the originating application X being terminated. In some embodiments, the core object into may be removed from the storage environment 190 in response to the originating application X being terminated even though the target application Y is still executing (e.g., operating).

In some embodiments, a link between the originating application X and the target application Y can be formed and/or removed manually by a user. In some embodiments, a link between originating application X and target application Y can be formed in response to an icon (e.g., a linking icon) from a portion of the user interface UIX being dragged over (or into a specified location within) the user interface UIY. Similarly, in some embodiments, a link between originating application X and target application Y can be removed in response to an icon (e.g., a linking icon) from a portion of the user interface UIX being removed from the user interface UIY. More details related to linking of applications via an icon are described in connection with, for example, FIGS. 6A and 6B. In some embodiments, a link between the originating application X and the target application Y can be formed and/or removed in response to various types of input from a user of the originating application X and/or the target application Y.

In some embodiments, a link between the originating application X and the target application Y can be formed in response to both the originating application X and the target application Y being opened (e.g., triggered for execution) within an operating environment. For example, a user can trigger the originating application X to start executing at a computer at a first time. The user can later trigger the target application Y to start executing at a computer at a second time. In response to the target application Y being triggered to execute, a link can be formed between the originating application X and the target application Y. Conversely, a link formed between the originating application X and the target application Y can be removed in response to execution of the originating application X and/or the target application Y being terminated.

As shown in FIG. 1, the link manager 130 includes a database link manager 134. The database link manager 134 can be configured to form or remove links between one or more databases associated with applications. For example, in response to one or more core objects 16 being stored in the storage environment 190 for target application Y, a database DBY associated with target application Y can be linked by the database link manager 134 to the one or more core objects 16 being stored in the storage environment 190 for target application Y. In response to a link between the originating application X and the target application Y being removed, one or more links between the target application Y and the one or more core objects 16 can be removed by the database link manager 134.

In some embodiments, the database DBY associated with application Y and the database DBX associated with application X can be independently operating databases. Accordingly, the storage environment 190 can function as a neutral environment for storing core objects 16 including data that can be passed between the applications (via their respective databases) in a compatible fashion.

In some embodiments, one or more of the core objects 16 can be produced in response to an instruction triggered by a user. For example, one or more of the originating objects 14 associated with the originating application X can be used to produce a core object (e.g., core object N2) in response to a user specifying that one or more of the originating objects 14 should be stored as the core object in storage environment 190.

In some embodiments, the object generator 140 can be configured to automatically produce one or more of the core objects 16 based on the originating objects 14 in response to the originating application X being triggered for execution (without being linked to a target application (e.g., target application Y)). In some embodiments, one or more preferences 11 stored in the memory 170 can include an indicator that triggers production of one or more of the core objects 16 based on the originating objects 14 when the originating application X is triggered for execution. In other words, core objects can be produced based on originating objects associated with an originating application based on one or more user preferences (and/or without being linked to a target application). In some embodiments, one or more core objects can be produced based on originating objects associated with the originating application by default (and/or without being linked to a target application).

In some embodiments, one or more of the preferences 11 can be defined by a user or can be associated with a user account of the user. In some embodiments, metadata that is associated with a core object (such as one or more functions and/or services that should be associate core object) can be defined by a user and/or can be included in one or more of the preferences 11.

In some embodiments, one or more of the core objects 16 can be produced based on the originating objects 14 associated with the originating application X by the object generator 140 and can later be linked to the target application Y. For example, a core objects from the core objects 16 can be produced based on at least one of the originating objects 14 based on one of the preferences 11 stored in the memory 170. After the target application Y is triggered for execution and/or linked to the originating application X, the target application Y (or a database associated with the target application Y) can be linked by the database link manager 134 to the core object from the core objects 16.

The object management module 110 (or any other portion of the device 206) can be configured to operate based on one or more platforms (e.g., one or more similar or different platforms) that can include one or more types of hardware, software, firmware, operating systems, runtime libraries, and/or so forth. In some implementations, the object management module 110 can be configured to operate at a device that can be, or can include, a cluster of devices (e.g., a server farm). In such an implementation, the functionality and processing of the object management module 110 can be distributed to several devices of the cluster of devices. In some implementations, one or more portions of the object management module 110 can be configured to operate at, for example, a remote device or a host (not shown).

In some implementations, the object management module 110 can be configured to operate at a host device. In such implementations, the object management module 110 can be accessed through a network by one or more client devices operating the applications X, Y, which can function as a client to the object management module 110 (which can be operating at a host). Accordingly, the functionality of the object management module 110 can be called and/or executed on an on-demand basis. In some implementations, the object management module 110 can function as a background application operating in conjunction with devices where the applications X, Y are operating (and/or additional devices). In some implementations, the object management module 110 can function as an application (or service) that can be accessed via an application programming interface (API).

The object management module 110 can be, or can include, any type of hardware and/or software configured to handle database objects. In some implementations, one or more portions of the components shown in the object management module 110 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the object management module 110 can be, or can include, a software module configured for execution by at least one processor (not shown). In some implementations, the functionality of the components can be included in different modules and/or different components than those shown in FIG. 1. For example, although not shown, the functionality of the link manager 130 of the object management module 110 can be included in a different module than the link manager 130 of the object management module 110, or divided into several different modules.

Although not shown, in some implementations, the object management module 110 (or portions thereof) can be configured to operate within, for example, a data center (e.g., a cloud computing environment), a computer system, one or more server/host devices, and/or so forth. In some implementations, the object management module 110 (or portions thereof) can be configured to operate within a network. Thus, the object management module 110 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 170 and/or the storage environment 190 can be any type of memory such as a random-access memory, a disk drive memory, flash memory, a database memory or storage device, and/or so forth. In some implementations, the memory 170 and/or storage environment 190 can be implemented as more than one memory component (e.g., more than one RAM component or disk drive memory) associated with the object management module 110. In some implementations, the memory 170 and/or the storage environment 190 can be, or can include, a non-local memory. For example, the memory 170 and/or the storage environment 190 can be, or can include, a memory shared by multiple devices (not shown). In some implementations, the memory 170 and/or the storage environment 190 can be associated with a server device (not shown) within a network and configured to serve the object management module 110.

Figure 2:
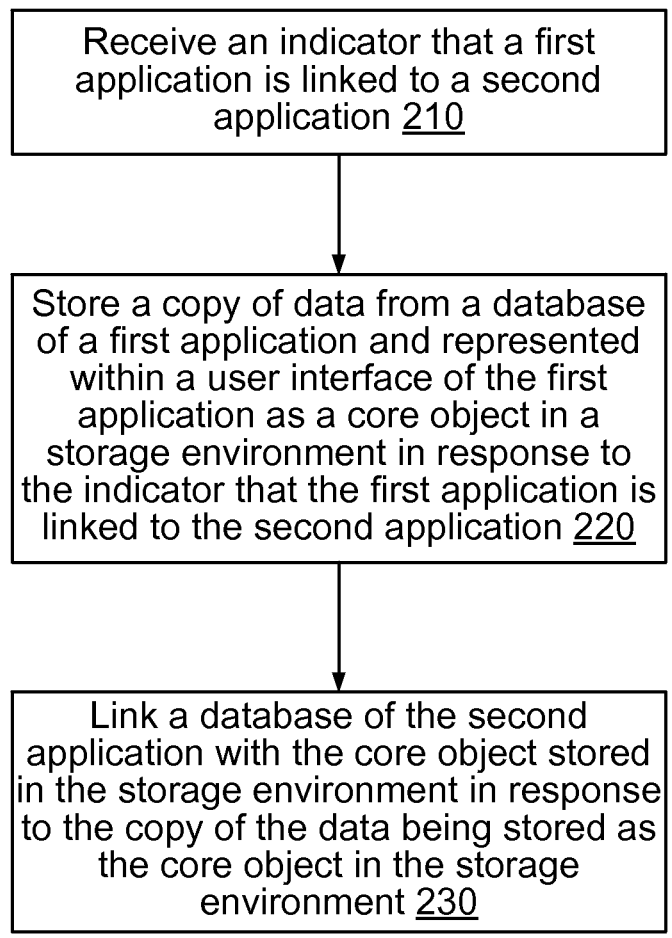
FIG. 2 is a flowchart that illustrates a method for handling a core object, according to an embodiment.

FIG. 2 is a flowchart that illustrates a method for handling a core object, according to an embodiment. In some embodiments, at least some portions of the method can be performed by the object management module 110 shown in FIG. 1.

As shown in FIG. 2, an indicator that a first application is linked to a second application is received (block 210). In some embodiments, the indicator can be received at the application link manager 132 of the link manager 130 shown in FIG. 1. In some embodiments, the first application to be linked to the second application manually by a user, automatically in response to both applications being triggered for execution (e.g., operation, execution in a common operating environment), and/or so forth.

A copy of data (e.g., data from an originating object) from a database of the first application and represented within a user interface of the first application can be stored as a core object in a storage environment in response to the indicator that the first application is linked to the second application (block 220). The copy of the data from the database can be stored as the core object by the object generator 140 of the object management module 110 shown in FIG. 1. In some embodiments, only a portion of the data from the database of the first application may be stored as the core object. In some embodiments, the core object can be produced based on a template and/or can be associated with metadata indicating one or more application in which the data of the core object can be used.

A database of the second application is linked with the core object stored in the storage environment in response to the copy of the data being stored as the core object in the storage environment (block 230). The database of the second application can be linked with the core object by the database link manager 134 of the link manager 130 shown in FIG. 1. In some embodiments, the core object can be linked with several databases of several applications that may or may not be linked with the first application. In some embodiments, after the link between the first application and the second application is removed, the core object stored in the cloud computing environment can be removed (e.g., deleted).

Figure 3:
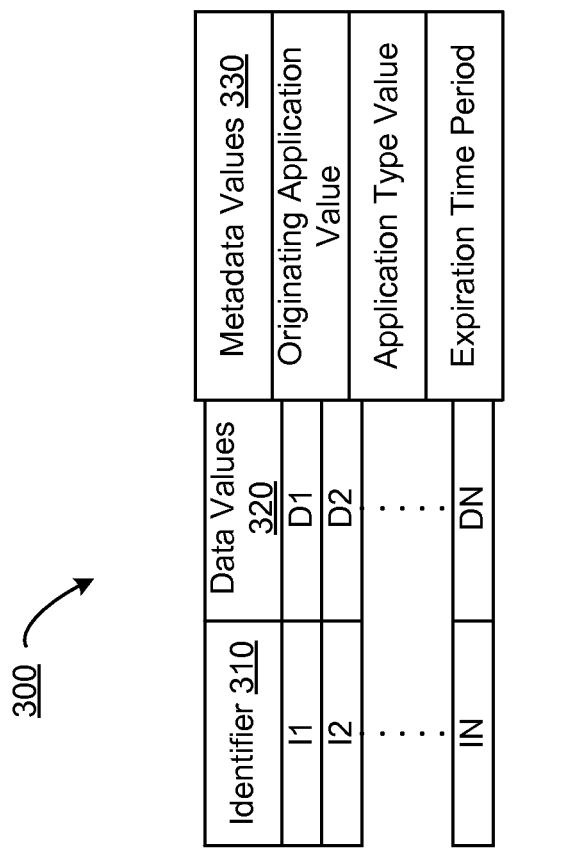
FIG. 3 is a diagram that illustrates a core object according to an embodiment.

FIG. 3 is a diagram that illustrates a core object 300 according to an embodiment. As shown in FIG. 3, the core object 300 includes various types of data. In this embodiment, several data values 320, which include data values D1 through DN, are associated with identifiers 310, which include identifiers I1 through IN. The core object 300 includes metadata values 330 including an originating application value, an application type value, and an expiration time period. The data included in the core object 300 is from an originating application represented by the originating application value. The data included in the core object 300 can be used with a target application represented by the application type value. The expiration time period represents a time period during which the core object 300 may be accessed by another application. After the expiration time period has expired, the core object 300 may be deleted from, for example, a storage environment (e.g., storage environment 190 shown in FIG. 1). Thus, the core object 300 can be temporarily stored in the storage environment.

FIGS. 4A through 4D are diagrams that illustrate production and use of a core object. Each of these diagrams includes a user interface side and a storage side. A user interface 401A for application 400A and a user interface 401B for application 400B are shown on the user interface side. The user interface 401A and application 400A are associated with a database 410A, and the user interface 401B and application 400B are associated with a database 410B, which are both shown on the storage side. The database 410A can be configured to function independently from the database 410B.

Figure 4A:
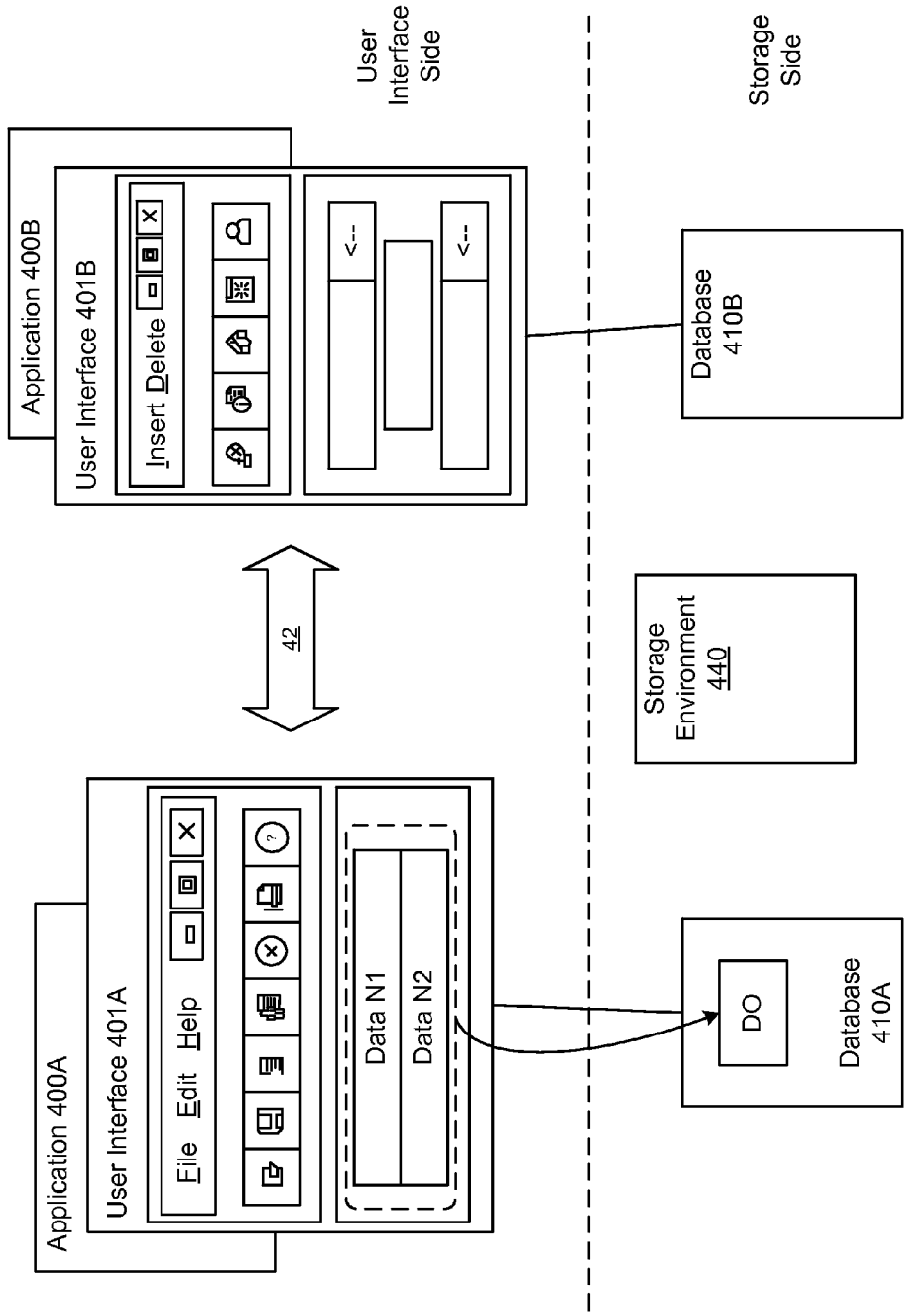
FIGS. 4A through 4D are diagrams that illustrate production and use of a core object.
Figure 4B:
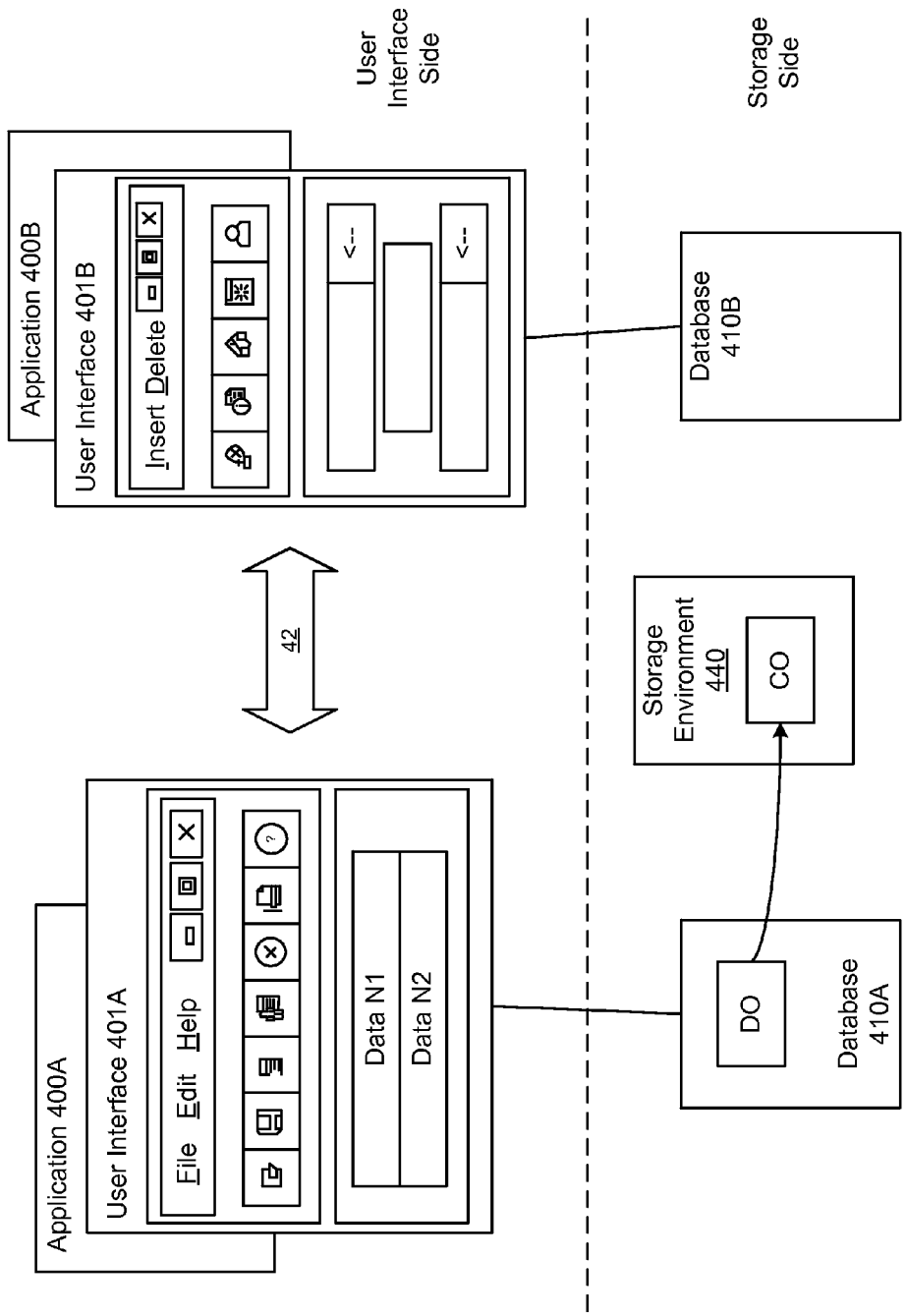

As shown in FIG. 4A, data N1 and data N2 are represented within the user interface 401A. The data N1 and/or the data N2 can be entered by a user into the user interface 401A via a user interface device (e.g., a keyboard, a mouse, a touch-screen device). After being entered into the user interface 401A, the data can be stored in an originating object DO stored in the database 410A. Although not shown in this embodiment, in some embodiments, the data N1 and/or the data N2, rather than being entered by a user via the user interface 401A, can be originally stored in the originating object DO and retrieved for display within the user interface 401A.

As represented by the arrow 42 shown in FIG. 4A, the application 400A (and user interface 401A) is linked to the application 400B (and user interface 401B) via the user interface 401A and the user interface 401B. Although not shown, in some embodiments, the user interface 401A and/or the user interface 401B can include a drop down menu through which linking between the applications can be implemented.

In response to the link formed between the application 400A and the application 400B via the user interface 401A and/or the user interface 401B, data included in the originating object DO is copied into the storage environment 440 as a core object CO. In other words, in this embodiment, the core object CO is an instance of the originating object DO. In some embodiments, the core object CO may be produced based on a template (e.g., one or more of the templates 12 shown in FIG. 1).

In some embodiments, only a portion of the data from the originating object DO may be copied and stored as the core object CO in the storage environment 440. In some embodiments, only the portions of data of the originating object DO that are represented within the user interface 401A may be copied into the storage environment 440 as core object CO. In some embodiments, only the portions of data of the originating object DO that are identified by a user may be copied into the storage environment 440 as core object CO. In some embodiments, the core object CO can include data for another original object (not shown) that may be associated with application 400A or another application (not shown).

Figure 4C:
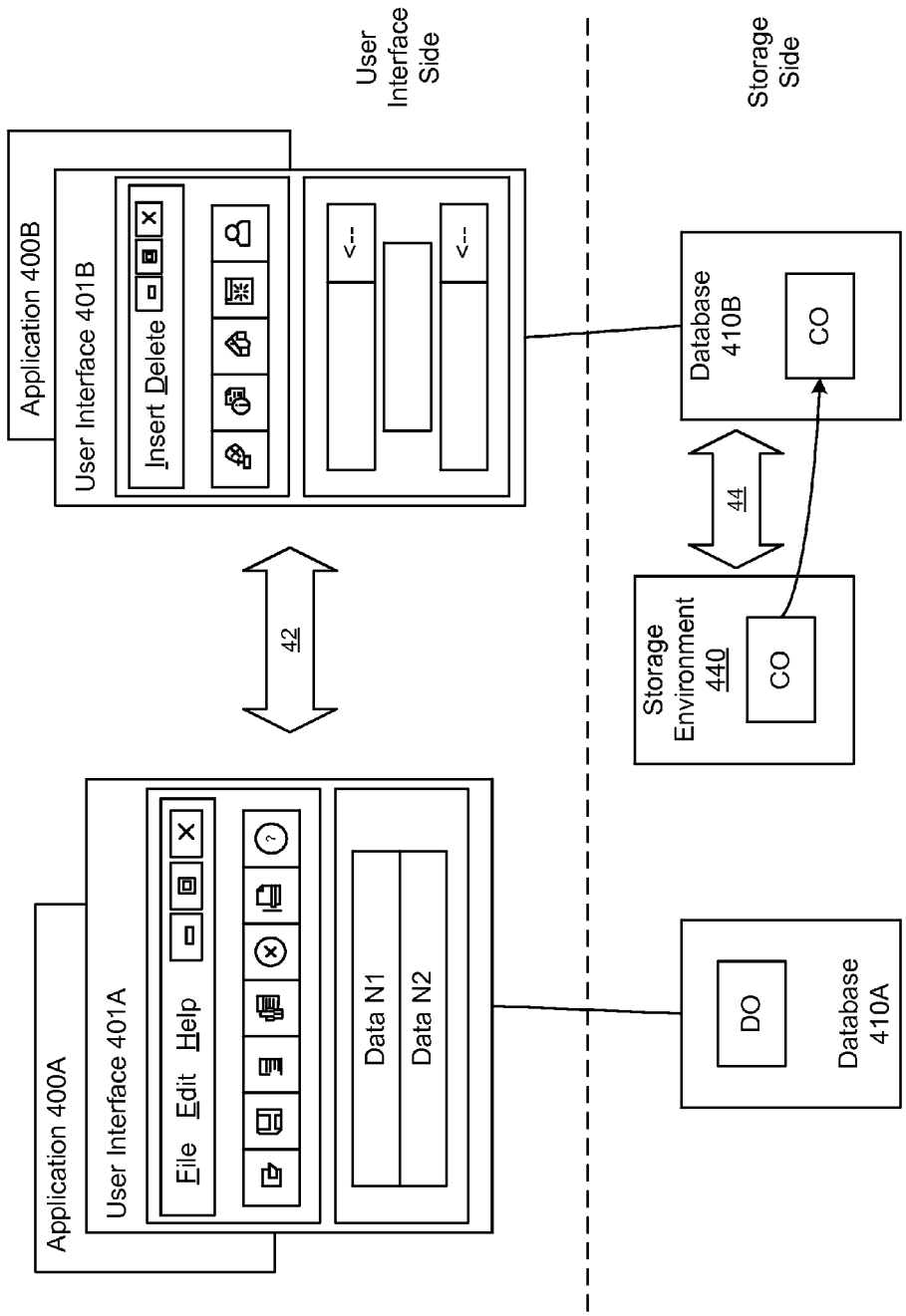

As represented by the arrow 44 shown in FIG. 4C, the database 410B associated with application 400B (and associated with user interface 401B) is linked with the storage environment 440. Also, in response to the linking of the database 410B with the storage environment 440, the core object CO is copied into the database 410B where data included in the core object CO can be used by application 400B and, for example, represented within the user interface 401B. In other words, the data included in the core object CO can be used by application 400B (by a user) after the database 410B is linked with the storage environment 440 so that the core object CO (or data included therein) is accessible by the application 400B (and the user interface 401B).

Figure 4D:
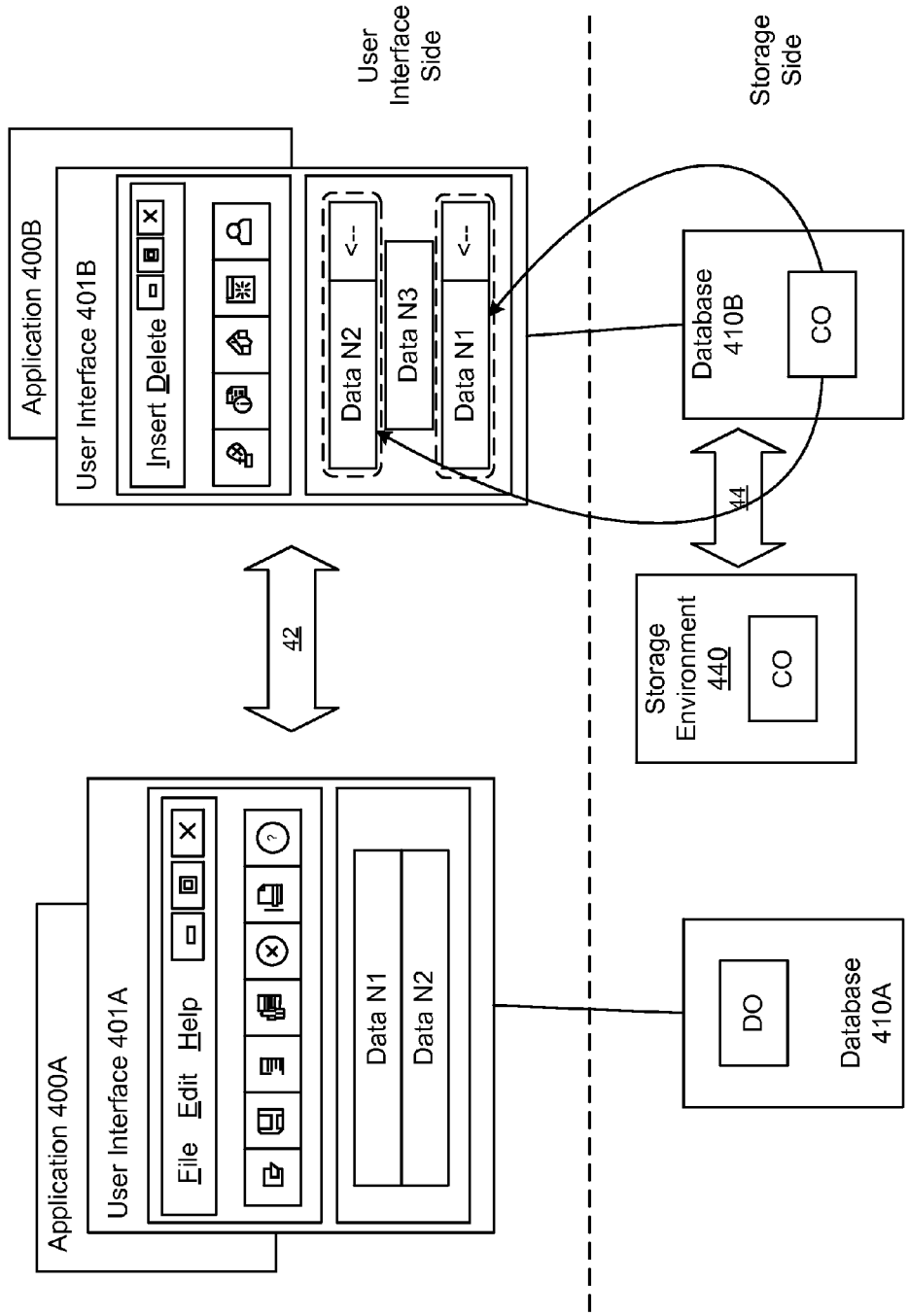

FIG. 4D is a diagram that illustrates data from the core object CO (which is a copy of the core object CO included in the storage environment 440) represented within the user interface 401B. Specifically, data N1 and data N2 are represented within fields within the user interface 401B. In this embodiment, data N3 is entered into a field of the user interface 401B, for example, in response to an input from the user and/or from another object (not shown) stored in the database 410B.

In some embodiments, at least a portion of the data of the core object can be automatically represented within (e.g., populated within, displayed within) the user interface 401B. In some embodiments, the data of the core object CO (which is copied from the originating object DO) can be automatically represented within the user interface of the 401B of the application B in response to (or based on) the prior linking between the application 400A (and the user interface 401A).

Figure 5:
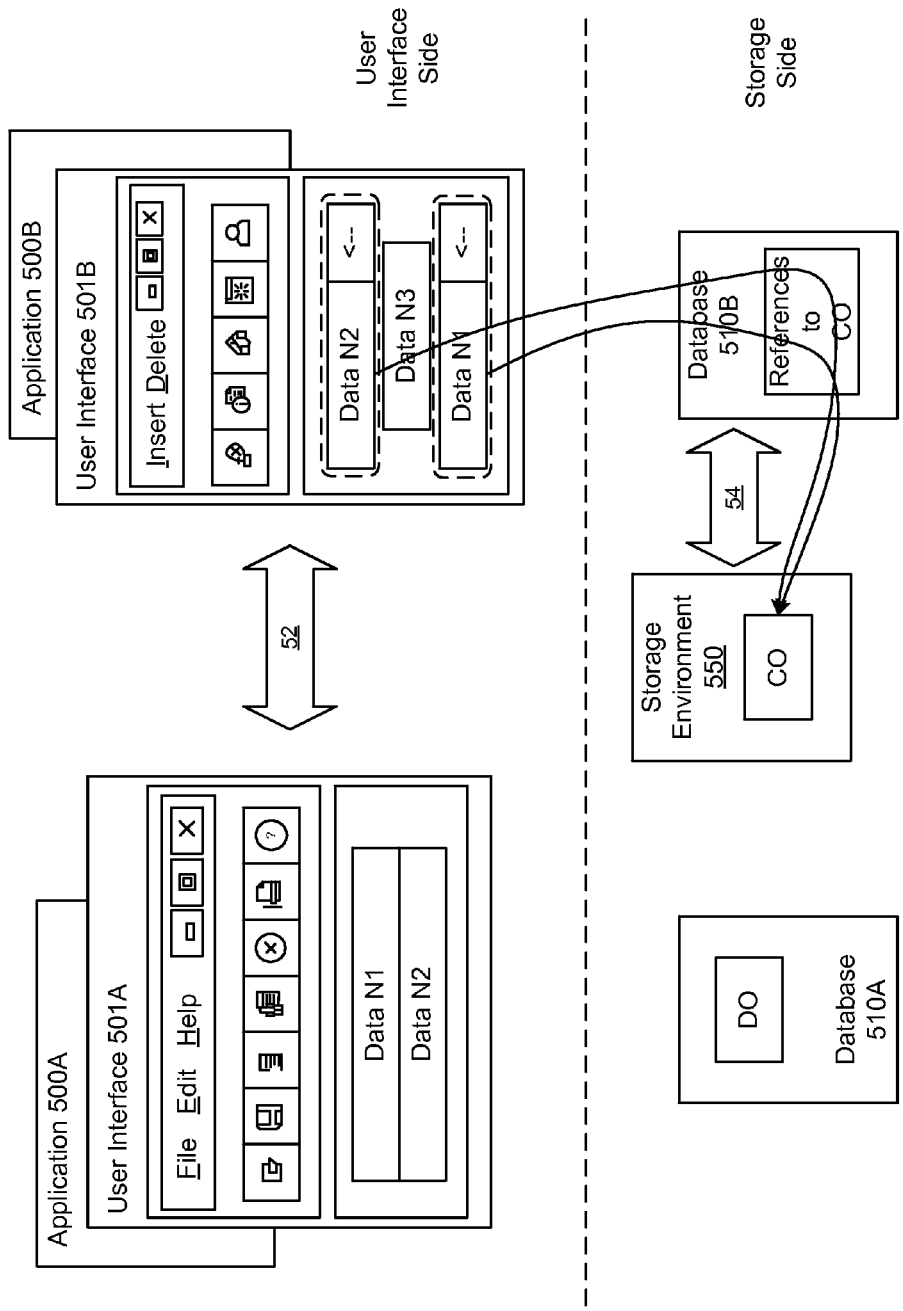
FIG. 5 is a diagram that illustrates data represented within a user interface.

FIG. 5 is a diagram that illustrates data represented within a user interface 501B. FIG. 5 illustrates a user interface 501A for application 500A and a user interface 501B for application 500B on a user interface side. The user interface 501A and application 500A are associated with a database 510A, and the user interface 501B and application 500B are associated with a database 510B. Both database 510A and database 510B are shown on a storage side.

In this embodiment, originating object DO is stored in database 510A and copied into storage environment 550 as core object CO in response to application 500A and application 500B being linked as represented by arrow 52. In this embodiment, database 510B is configured to store references (e.g., pointers) to the core object CO (or data included therein) stored in the storage environment 550 rather than storing an instance of (or a copy of) the core object CO locally at the database 510B. Accordingly, data N1 and data N2 are included in (e.g., represented within, displayed within) user interface 501B via the references stored in the database 510B.

Figure 6A:
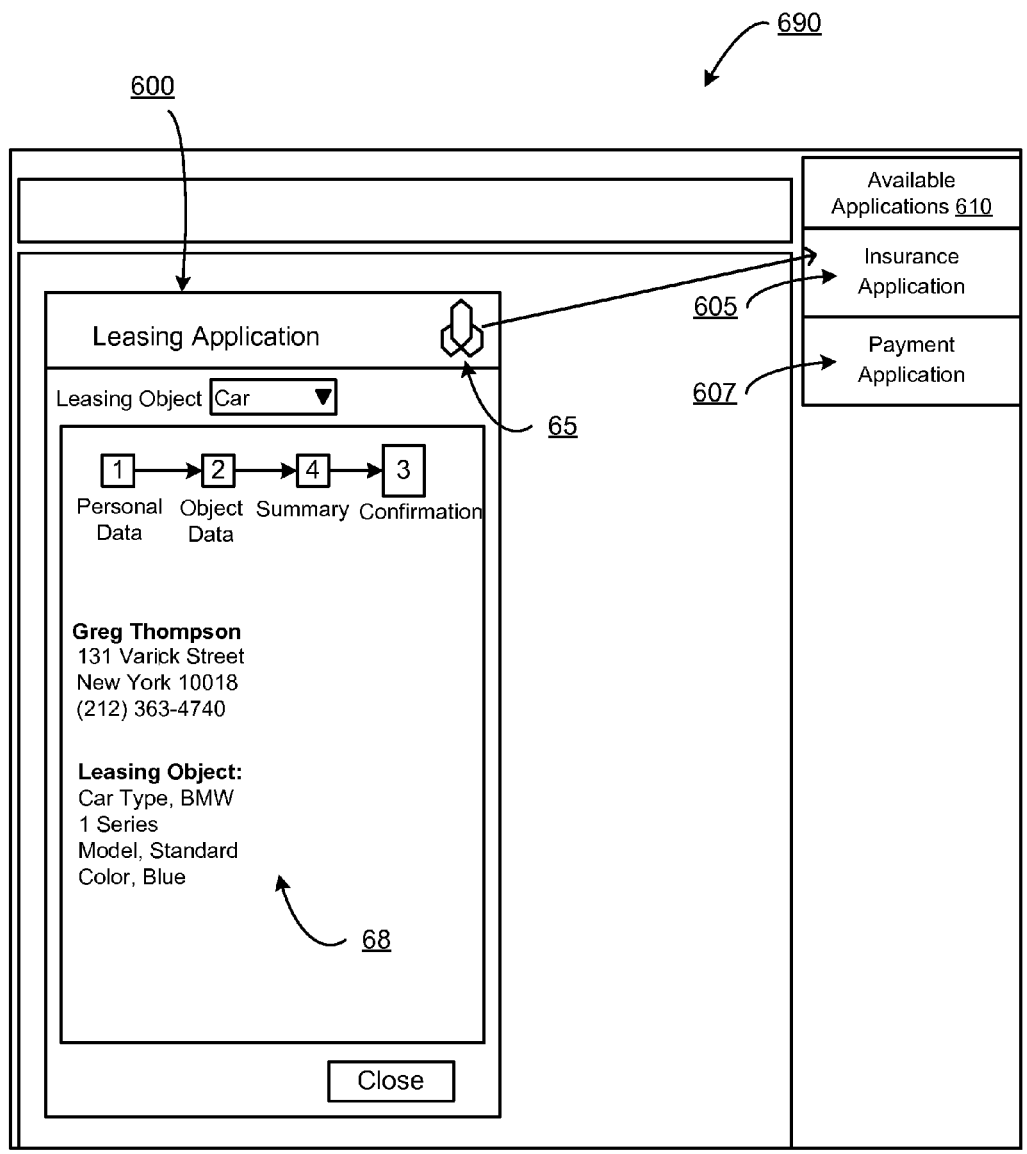
FIGS. 6A and 6B are screenshots that illustrate a user interface through which applications can be linked.

FIG. 6A is a screenshot that illustrates a user interface 690 through which applications can be linked. Specifically, the user interface 690 illustrates a user interface 600 of a leasing application that includes an icon 65 that can be used to link the leasing application with one or more available applications 610. In this embodiment, an identifier 605 of an insurance application (not shown) and an identifier 607 of a payment application (not shown) represent the insurance application and the payment application, respectively, as being available applications 610.

Figure 6B:
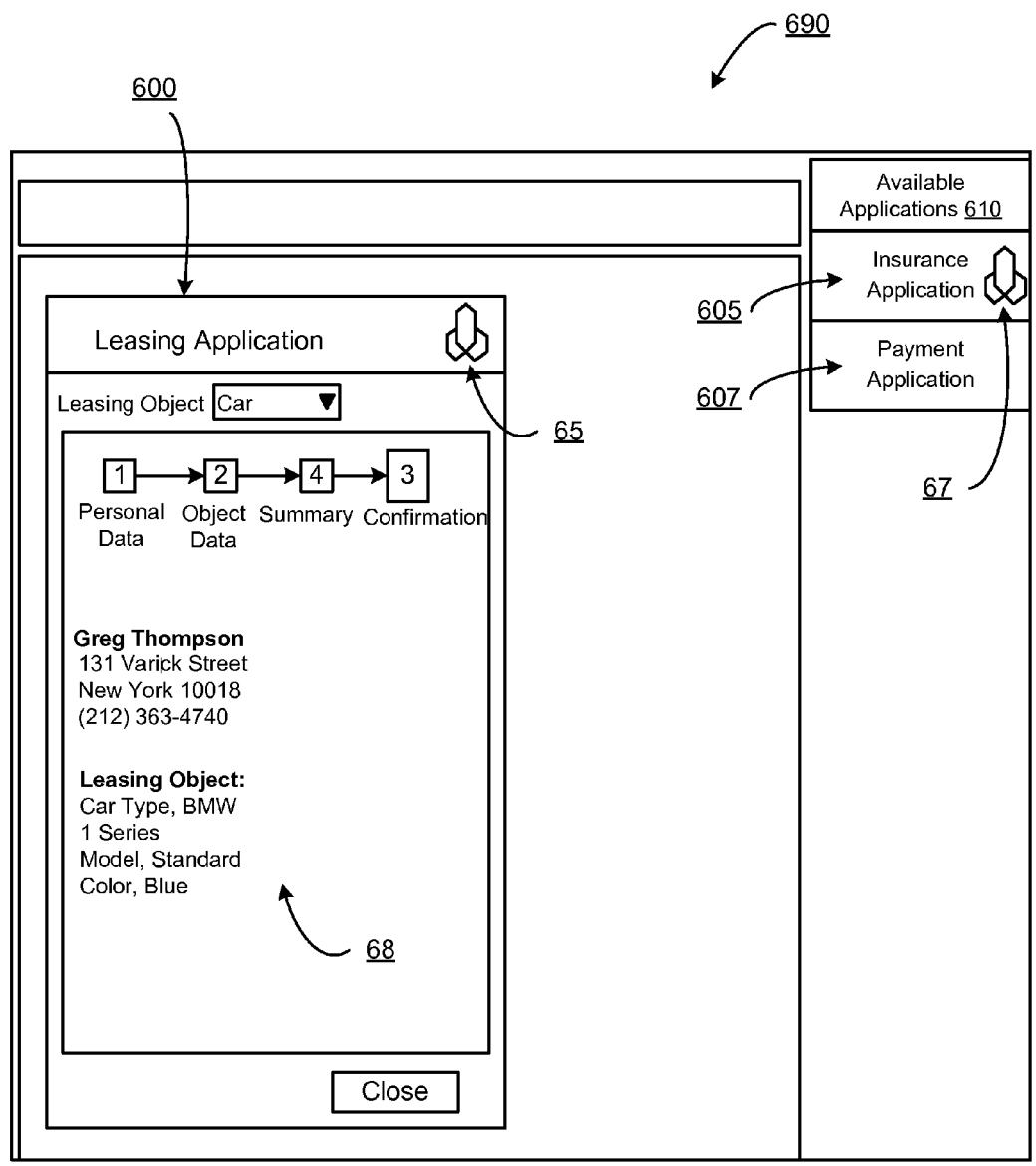

As shown in FIG. 6A, the icon 65 can be dragged (as represented by the arrow) onto the identifier 605 of the insurance application to cause the leasing application to be linked (e.g., logically linked) with the insurance application. As shown in FIG. 6B, an icon 65 is shown near the identifier 605 of the insurance application to indicate that the leasing application has been linked with the insurance application.

Data 68, which is represented within a portion of the user interface 600 of the leasing application can be included in one or more objects (e.g., originating objects). In response to the linking of the insurance application with the user interface 600 of the leasing application, one or more core objects can be defined based on the data 68 so that at least a portion data 68 can be used by (e.g., in conjunction with) the insurance application.

Figure 7:
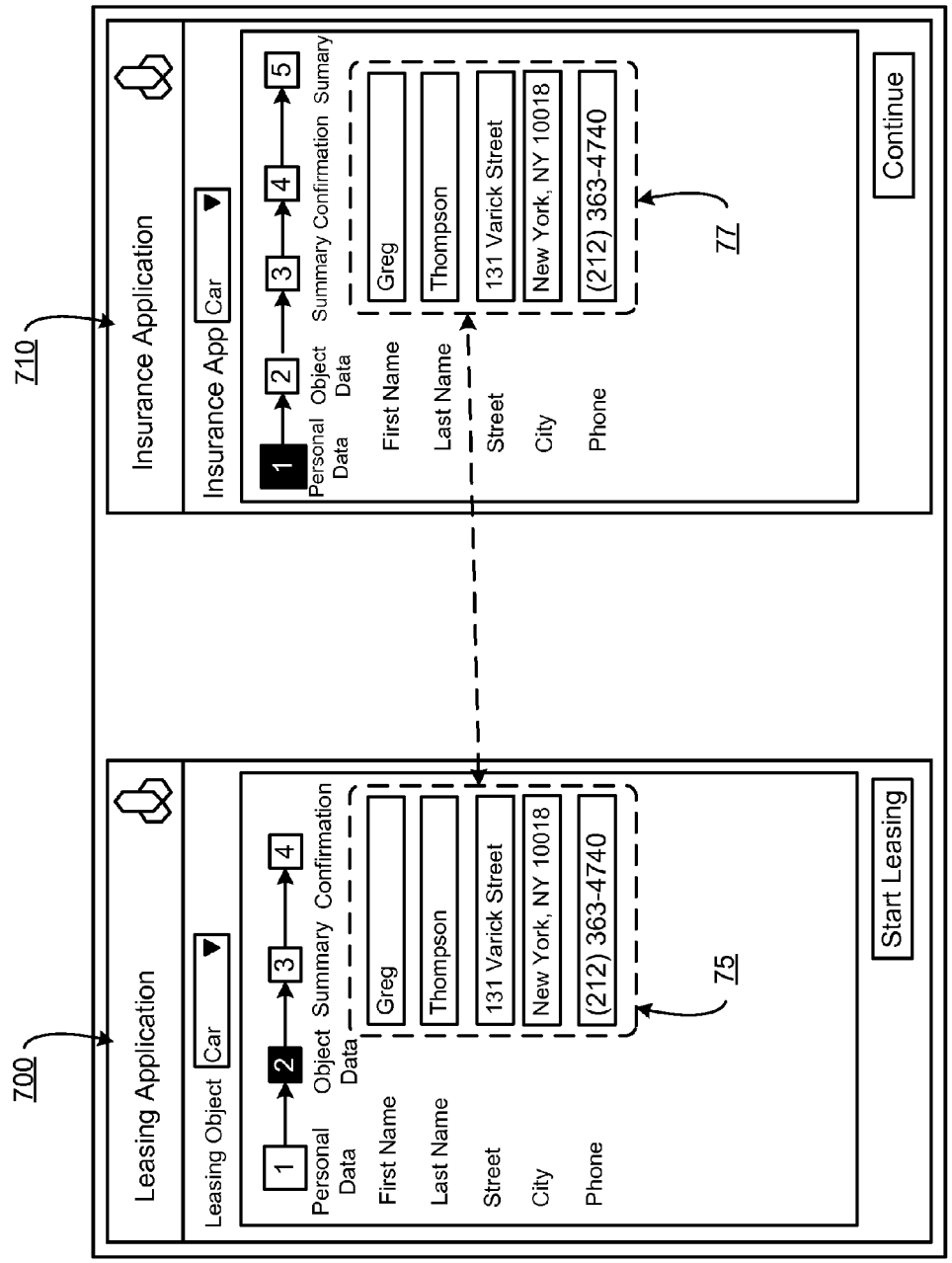
FIG. 7 is a screenshot that illustrates linked applications, according to an embodiment.

FIG. 7 is a screenshot that illustrates linked applications, according to an embodiment. Specifically, a leasing application (represented by user interface 700) is linked with an insurance application (represented by user interface 710). As shown in FIG. 7, data 75 represented within the user interface 700 of the leasing application is represented within the user interface 710 of the insurance application as data 77. The data 77 can be included in the user interface 710 of the insurance application via a core object (not shown) stored in a storage environment (not shown). In some embodiments, the core object can be based on at least a portion of data included in an object (e.g., an originating object) (not shown) associated with a database (not shown).

In some embodiments, the leasing application can be linked to the insurance application via, for example, the user interface 690 shown in FIG. 6A and 6B. In some embodiments, the data 77 can be populated within the user interface 710 of the insurance application in response to the linking of the insurance application with the leasing application. In some embodiments, the data 77 can be populated within the user interface 710 of the insurance application based on metadata describing the data 75 and produced for the data 75 when the data 75 is copied into a core object.

Figure 8:
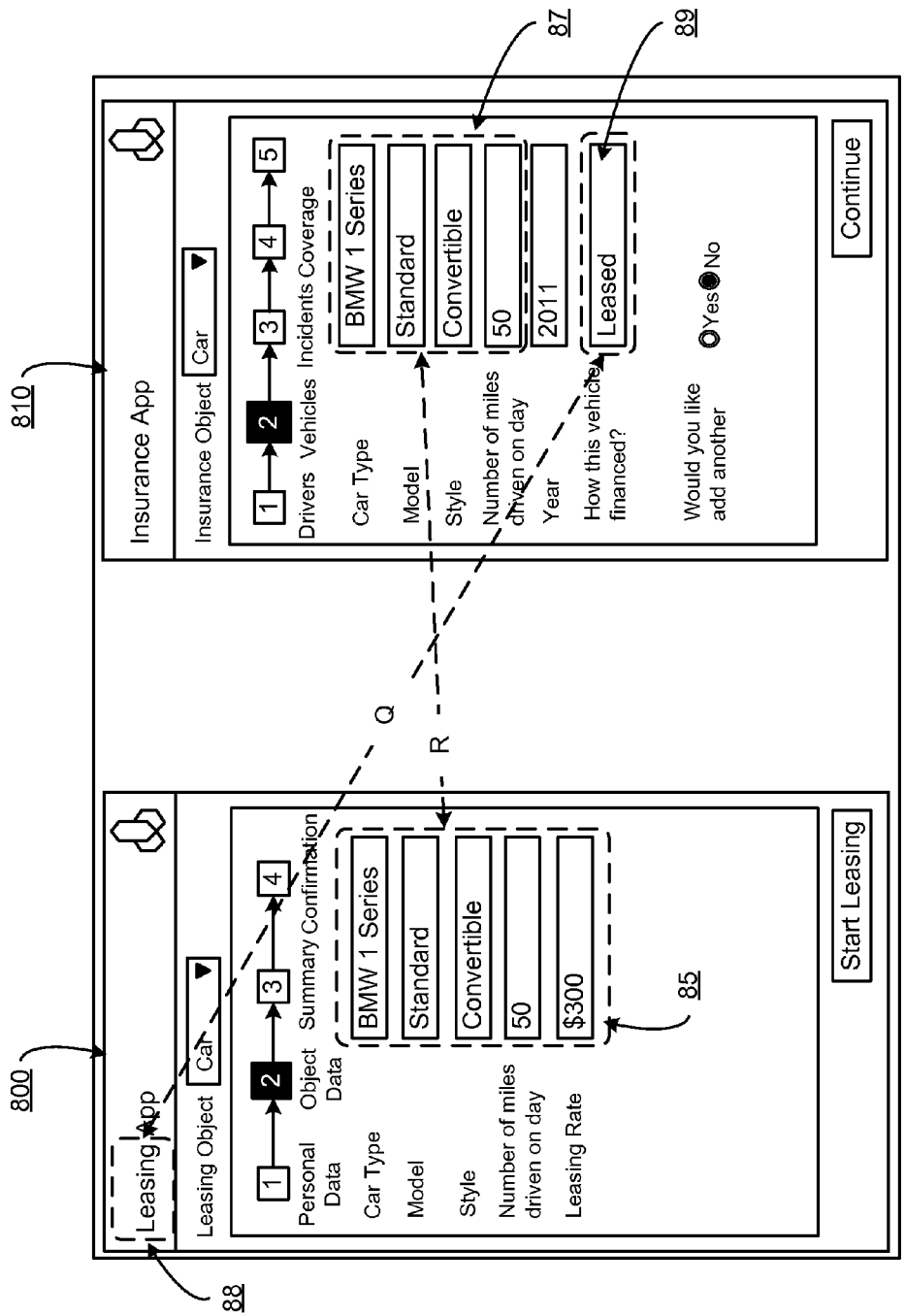
FIG. 8 is another screenshot that illustrates linked applications, according to an embodiment.

FIG. 8 is another diagram that illustrates linked applications, according to an embodiment. Specifically, a leasing application (represented by user interface 800) is linked with an insurance application (represented by user interface 810). As shown in FIG. 8, data 85 represented within the user interface 800 of the leasing application is represented within the user interface 810 of the insurance application as data 87. The data 87 can be included in the user interface 810 of the insurance application via a core object (not shown) stored in a storage environment (not shown). In some embodiments, the core object can be based on at least a portion of data included in an object (e.g., an originating object) (not shown) associated with a database (not shown). The relationship between the data 85 and the data 87 is represented by line R. In this embodiment, only a portion of the data 85 (which is displayed within the user interface 800) is included in the data 87 (which is displayed within the user interface 810).

In some embodiments, the data 87 can be populated within the user interface 810 of the insurance application based on metadata describing the data 85 (when the data 85 is copied into a core object). Specifically, in this embodiment, the data 85 can be included in a core object with metadata indicating that the data 85 included in the core object is associated with the leasing application. The metadata can be derived from a description of the application. In this embodiment, the metadata is represented by a portion 88 of the title of the leasing application. The metadata indicating that the data 85 is associated with the leasing application can be matched with an indicator 89 that the insurance application is associated with a leased product. This relationship is represented by line Q.

In this embodiment, the data 87 can be populated within the user interface 810 of the insurance application in response to the linking of the insurance application with the leasing application. In some embodiments, if the leasing application is linked with the insurance application before the data 85 is represented within the user interface 800 associate with the leasing application, the data 87 can be concurrently represented within the user interface 810 of the insurance application. In such embodiments, a core object can be dynamically modified and updated as the data 85 is being entered by a user into the user interface 800. Accordingly, the data 87 included in the user interface 810 of the insurance application can also be dynamically modified and updated as the data 85 is being entered by user via the user interface 800.

In some embodiments, the leasing application can be linked to the insurance application via, for example, the user interface 690 shown in FIG. 6A and 6B. In some embodiments, the leasing application can be linked to the insurance application before either of the applications are triggered for execution and/or are used by a user.

Implementations of the various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry (e.g., an FPGA (field programmable gate array) or an ASIC (application-specific integrated circuit)).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory may be supplemented by, or incorporated in special purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser) through which a user can interact with an implementation, or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer system including instructions stored on a non-transitory computer-readable storage medium, the computer system comprising:
    an object management module configured to make an originating object of a first application available to a second application via a core object, the originating object being stored in a first database that is accessible by the first application, and the core object being stored in a second database that is inaccessible by the first application, the object management module including:
        an application link manager configured to detect a creation of a link between the first application and the second application, the second application being different than the first application, the first application handling data in a manner incompatible with the second application, the link providing the second application access to the first application and being created in response to a request to move an icon included in a first user interface of the first application into a second user interface of the second application;
        an object generator configured to, in response to the application link manager detecting the creation of the link:
            store data from the originating object of the first application, the originating object being incompatibly processable by the second application; and
            define the core object based on data from the originating object of the first application including translating data from the originating object into the core object with a format compatible with the second application based on a template; and
        a directory manager configured to make a copy of the data from the originating object available for use in a third application via the core object, the third application linked to the first application and handling data in a manner incompatible with the first application, until the copy of the data from the originating object is deleted in response to the link between the first application and the second application being terminated.

2. The computer system of claim 1, wherein:
    the application link manager is configured to receive an indicator that the link between the first application and the second application has been terminated, and
    the object generator is configured to delete a copy of the data from the originating object in response to the indicator that the link between the first application and the second application has been terminated.

3. The computer system of claim 1, wherein the object generator is configured to delete a copy of the data before the link between the first application and the second application is terminated.

4. The computer system of claim 1, further comprising:
    a storage environment configured to store a plurality of core objects including the core object, wherein the directory manager is configured to provide a description of data available in each core object from the plurality of core objects.

5. The computer system of claim 1, further comprising:
    a database associated with the first application, the database including a reference to at least a portion of a copy of the data from the originating object,
    wherein the object generator is configured to permit access to the second application to represent a portion of the data in at least one field in the second user interface via the reference.

6. The computer system of claim 1, wherein a copy of the data from the originating object is stored as an object while the first application is linked to the second application.

7. The computer system of claim 1, wherein the object generator is configured to remove a copy of the data from the originating object in response to a portion of the data being represented in at least one field in the second user interface.

8. The computer system of claim 1, wherein the object generator is configured to deny a request from the third application to access the copy of the data from the originating object when the third application is not linked to the first application.

9. The computer system of claim 1, wherein the directory manager is configured to calculate a value representing a probability that at least a portion of the data from the originating object will be accessed by the second application.

10. The computer system of claim 1, wherein:
    the application link manager is configured to detect a creation of a link between a third application and the first application, and
    the computer system further comprises a database link manager configured to link a database of the third application with the core object in response to the detection that the third application is linked to the first application.

11. The computer system of claim 1, wherein a copy of the data from the originating object is stored until expiration of a specified time period.

12. A non-transitory computer-readable storage medium storing instructions that when executed cause a processor to perform a process, the instructions comprising instructions to:
    detect a creation of a link between a first application and a second application different than the first application, the first application handling data in a manner incompatible with the second application, the link providing the second application access to an originating object stored in a first database of the first application via a core object, and the link being created in response to a request to move an icon included in a first user interface associated with the first application into a second user interface of the second application; and
    in response to the detection of the creation of the link:
        store data from the originating object of the first application, the originating object being incompatibly processable by the second application;
        define the core object for the second application based on data from the originating object of the first application, including translating data from the originating object into the core object with a format compatible with the second application based on a template; and make a copy of the data from the originating object available for use in a third application via the core object, the third application linked to the first application and handling data in a manner incompatible with the first application, until the copy of the data from the originating object is deleted in response to the link between the first application and the second application being terminated.

13. The non-transitory computer-readable storage medium of claim 12, wherein the instructions further comprise instructions to provide a description of data available in each of a plurality of core objects.

14. A method including executing instructions recorded on a non-transitory computer-readable storage media using at least one processor, the method comprising:

detecting a creation of a link between a first application and a second application different than the first application, the first application handling data in a manner incompatible with the second application, the link providing the second application access to the first application via a core object, and being created based on receiving a request to move an icon included in a first user interface of the first application into a second user interface of the second application; and in response to the detection of the creation of the link:

storing data from an originating object of the first application, the originating object being incompatibly processible by the second application;

defining the core object for the second application based on data from the originating object of the first application, including translating data from the originating object into the core object with a format compatible with the second application based on a template; and making a copy of the data from the originating object available for use in a third application via the core object, the third application linked to the first application and handling data in a manner incompatible with the first application, until the copy of the data from the originating object is deleted in response to the link between the first application and the second application being terminated.

15. The computer system of claim 1, further comprising a template selector configured to select the template based on compatibility of the template with the originating object.

16. The computer system of claim 1, wherein the object generator is configured to translate the data by:

associating the data with metadata identifying fields of the data; and defining the core object by inserting the data and associated metadata into the template.

17. The computer system of claim 16, wherein the metadata include a description of the first application.

18. The computer system of claim 17, wherein the second application includes an indicator of the description of the first application based on the metadata including the description of the first application.

19. The computer system of claim 1, wherein the object generator is configured to translate the data from the originating object into the core object with the format compatible with the second application based on the template by:

producing metadata describing data included in the originating object;

producing metadata describing the first application;

inserting the data included in the originating object into the template based on the metadata describing data included in the originating object; and inserting the metadata describing the first application into the template.

20. The non-transitory computer-readable storage medium of claim 12, wherein, prior to the creation of the link, the first database is accessible to the first application and inaccessible to the second application and the second database is accessible to the second application and inaccessible to the first application.

21. The method of claim 14, wherein the link is configured to provide the second application access to the originating object stored in a first database of the first application, the first database being inaccessible to the second application prior to the creation of the link.

* * * * *